(12) United States Patent
Roden et al.

(10) Patent No.: US 9,846,897 B2
(45) Date of Patent: Dec. 19, 2017

(54) SYSTEMS AND METHODS FOR PROVIDING DIRECT SHIPPING TO MOBILE SUBSCRIBERS

(75) Inventors: Barbara Roden, Atlanta, GA (US); Matthew Hull, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1571 days.

(21) Appl. No.: 12/270,013

(22) Filed: Nov. 13, 2008

(65) Prior Publication Data

US 2010/0121730 A1 May 13, 2010

(51) Int. Cl.
*G06Q 30/06* (2012.01)
*G06Q 40/00* (2012.01)
*G06Q 30/02* (2012.01)

(52) U.S. Cl.
CPC ......... *G06Q 30/06* (2013.01); *G06Q 30/0601* (2013.01); *G06Q 30/0603* (2013.01); *G06Q 40/12* (2013.12); *G06Q 30/02* (2013.01); *G06Q 40/00* (2013.01)

(58) Field of Classification Search
CPC .... G06Q 30/02; G06Q 30/0601; G06Q 30/06; G06Q 30/0641; G06Q 40/00
USPC .......................................................... 705/26
See application file for complete search history.

(56) References Cited

U.S. PATENT DOCUMENTS

| | | | | |
|---|---|---|---|---|
| 7,865,394 B1* | 1/2011 | Calloway et al. | ........... | 705/14.4 |
| 2002/0161641 A1* | 10/2002 | Quinlan et al. | ................. | 705/14 |
| 2002/0187772 A1* | 12/2002 | Hyyppa et al. | ............... | 455/411 |
| 2002/0194069 A1* | 12/2002 | Thakur et al. | ................... | 705/14 |
| 2003/0144850 A1* | 7/2003 | Franks et al. | ..................... | 705/1 |
| 2003/0216960 A1* | 11/2003 | Postrel | ............................ | 705/14 |
| 2005/0261990 A1* | 11/2005 | Gocht et al. | .................... | 705/27 |
| 2006/0258397 A1* | 11/2006 | Kaplan et al. | ............ | 455/556.1 |
| 2007/0198339 A1* | 8/2007 | Shen et al. | ...................... | 705/14 |
| 2008/0097851 A1* | 4/2008 | Bemmel et al. | ................ | 705/14 |
| 2008/0288351 A1* | 11/2008 | Leung et al. | ................... | 705/14 |

OTHER PUBLICATIONS

Kane, Kevin. Access control in decentralized, distributed systems. The University of Texas at Austin, ProQuest Dissertations Publishing, 2007.*

* cited by examiner

*Primary Examiner* — Ryan Zeender
*Assistant Examiner* — Fawaad Haider
(74) *Attorney, Agent, or Firm* — Hartman & Citrin LLC

(57) ABSTRACT

Systems and methods for providing direct shipping to mobile subscribers are disclosed. A customer ordering system receives an order request, retrieves subscriber information requested by an advertiser, and populates an order form with the retrieved information. The information can be reviewed, edited, and/or confirmed, and the order can be passed to an order fulfillment entity. Networks and devices for providing the disclosed systems and methods are also disclosed. Exemplary computer-readable media storing corresponding instructions are also disclosed. A device that executes the instructions can perform the disclosed methods and/or provide the functionality of the disclosed systems.

11 Claims, 7 Drawing Sheets

SYSTEMS AND METHODS FOR PROVIDING DIRECT SHIPPING TO MOBILE SUBSCRIBERS

TECHNICAL FIELD

The present disclosure relates generally to communications networks and, more particularly, to systems and methods for providing direct shipping to mobile subscribers.

BACKGROUND

The Internet has become a popular and effective marketing medium. As global Internet use has soared, Internet advertising has become one of the most efficient ways to market products, services, and companies. The Internet allows companies to reach users almost instantaneously on a nearly global scale. Additionally, consumers have become accustomed to the nearly instant gratification of seeing, researching, and buying products and services on the Internet.

Concurrently, the number of cellular telephone users worldwide has skyrocketed. Some estimates put the number of cellular subscribers in the United States at over 275 million. An increasing number of mobile devices include data services, in addition to traditional voice service. It is now possible for many mobile subscribers to access Internet content from a mobile device.

While the mobile Internet continues to become a key component of global sales and marketing, mobile devices continue to evolve. Some of today's mobile devices have more computing power than was once possible in desktop computers. Many of today's mobile devices run mobile versions of popular operating systems such as Windows®, for example WindowsMobile®, and MacOS X, in the form of iphone OS. Some of today's mobile phones include scaled down versions of popular web browsing software such as, for example, Internet Explorer® and Safari®. As such, the mobile Internet is growing more and more popular.

E-commerce has seen corresponding growth on the Internet. It is now possible to handle financial transactions on wireless devices. For example, many users now pay bills, check banking account balances, transfer funds, and purchase goods and services on the Internet with a mobile device. While display size, keyboard limitations, and security have been concerns in the past, many of these concerns are now being addressed. As such, it seems that the growth of Internet use on mobile devices will continue to grow.

SUMMARY

The present disclosure includes systems and methods that allow devices to quickly and conveniently place orders over the mobile Internet. Some embodiments of the present disclosure are particularly useful for use with devices that have small displays, low resolution displays, and/or small keyboards. A substantial portion of the data sometimes requested by an advertising entity can be stored in a storage location of the communications network. The data can be accessed as needed and passed to a network node for partial or complete population of order forms generated based upon advertisements. Users can review, edit, and confirm the contents of the order forms, and order information can be passed to order fulfillment entities.

According to an embodiment of the present disclosure, a device for providing direct shipping to a mobile subscriber placing an order over a wireless communication network, includes a processor and a memory in communication with the processor. The memory is configured to store instructions, executable by the processor to acquire data relating to the identity of a wireless device at which an order request is made, the order request including the following of a link included in an advertisement relating to an advertising entity. Further, the processor determines subscriber data requested by the advertising entity, the subscriber data including information requested by the advertising entity to satisfy the order request; retrieves, from a data storage location, the subscriber data corresponding to the wireless device; creates an order record, the order record including data identifying an order and the subscriber data; and passes the order record to an order fulfillment entity for order fulfillment.

In some embodiments, instructions further include instructions executable by the processor to acquire data relating to the identity of a wireless device at which an order request is made. The order request can include a request for an advertised product indicated by the advertisement relating to the advertising entity. In some embodiments, the device includes instructions, executable by the processor to generate an order form including data identifying the advertised product and the retrieved subscriber data. The order form can be generated by creating the order form including a field for the subscriber data requested by the advertising entity, and populating the order form with the subscriber data retrieved from the data storage location. The order form can be populated by entering the subscriber data in the field for the subscriber data.

In some embodiments, the device includes instructions, executable by the processor to allow retrieval of the order form by the subscriber to confirm the accuracy of the order form, and receive confirmation by the subscriber, that the order form is accurate. The instructions for generating the order form can further include instructions, executable by the processor to dynamically generate a web page including the order form. The web page can be generated in hypertext markup language (HTML), extensible hypertext markup language (XHTML), wireless markup language (WML), and/or scripted or coded in various languages including JAVA, CGI, Perl, C, ASP, JSP, and the like.

The instructions for retrieving the subscriber data can further include instructions, executable by the processor to retrieve, from a subscriber database of a cellular communications network, the subscriber data corresponding to the wireless device. In some embodiments, the subscriber database is a home location register (HLR) of a cellular communication network.

According to another embodiment, a method for providing direct shipping to a mobile subscriber placing an order over a wireless communication network, includes acquiring, at a customer ordering system (COS), data relating to the identity of a wireless device at which an order request is made, the order request including the following of a link included in an advertisement relating to an advertising entity; determining, at the COS, subscriber data requested by the advertising entity, the subscriber data including information requested by the advertising entity to satisfy the order request; retrieving from a data storage location associated with a communications network, the subscriber data corresponding to the wireless device; creating, at the COS, an order record, the order record including data identifying an order and the subscriber data; and transmitting, from the COS to an order fulfillment entity, the order record.

In some embodiments, the acquiring data further includes acquiring, at the COS, data relating to the identity of a wireless device at which an order request is made, the order request including a request for an advertised product indicated by the advertisement relating to the advertising entity. The method can also include generating an order form including data identifying the advertised product and the retrieved subscriber data. Generating the order form can further include creating, at the COS, the order form, the order form including a field for the subscriber data requested by the advertising entity; and populating, at the COS, the order form with the subscriber data retrieved from the data storage location, wherein the order form is populated by entering the subscriber data in the field for the subscriber data.

In some embodiments, the method further includes allowing retrieval of the order form by the subscriber to confirm the accuracy of the order form, and receiving confirmation by the subscriber, that the order form is accurate. The order form can be generated dynamically by a landing page. The order form can include a web page that includes the order form.

In some embodiments, the retrieving subscriber data further includes retrieving, from a subscriber database of a cellular communications network with which the wireless device is registered, the subscriber data corresponding to the wireless device. In some embodiments, the subscriber database is one or more subscriber databases, and includes a home location register (HLR) with which the wireless device is registered.

According to another embodiment of the present disclosure, a computer readable medium includes computer readable instructions that, when executed, perform the steps of directing a customer ordering system (COS) to acquire data relating to the identity of a wireless device at which an order request is made, the order request including the following of a link included in an advertisement relating to an advertising entity; directing a COS to determine subscriber data requested by the advertising entity, the subscriber data including information requested by the advertising entity to satisfy the order request; directing a COS to retrieve, from a data storage location associated with a communications network, the subscriber data corresponding to the wireless device; directing the COS to create an order record, the order record including data identifying an order and the subscriber data; and directing the COS to transmit the order record to an order fulfillment entity.

In some embodiments, the computer readable instructions further include computer readable instructions that, when executed, perform the step of acquiring, at the COS, data relating to the identity of a wireless device at which an order request is made, the order request including a request for an advertised product indicated by the advertisement relating to the advertising entity. In some embodiments, the computer readable instructions further include computer readable instructions that, when executed, perform the step of generating an order form including data identifying the advertised product and the retrieved subscriber data.

In some embodiments, the computer readable instructions for directing the COS to generate the order form further include computer readable instructions that, when executed, perform the steps of directing the COS to create the order form, the order form including a field for the subscriber data requested by the advertising entity; and directing the COS to populate the order form with the subscriber data retrieved from the data storage location, wherein the order form is populated by entering the subscriber data in the field for the subscriber data.

In some embodiments the computer readable instructions further include computer readable instructions that, when executed, perform the step of directing the COS to allow retrieval of the order form by the subscriber to allow the subscriber to confirm the accuracy of the order form.

In some embodiments, the computer readable instructions for generating the order form further include computer readable instructions that, when executed, perform the step of directing a landing page to dynamically generate a web page including the order form.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
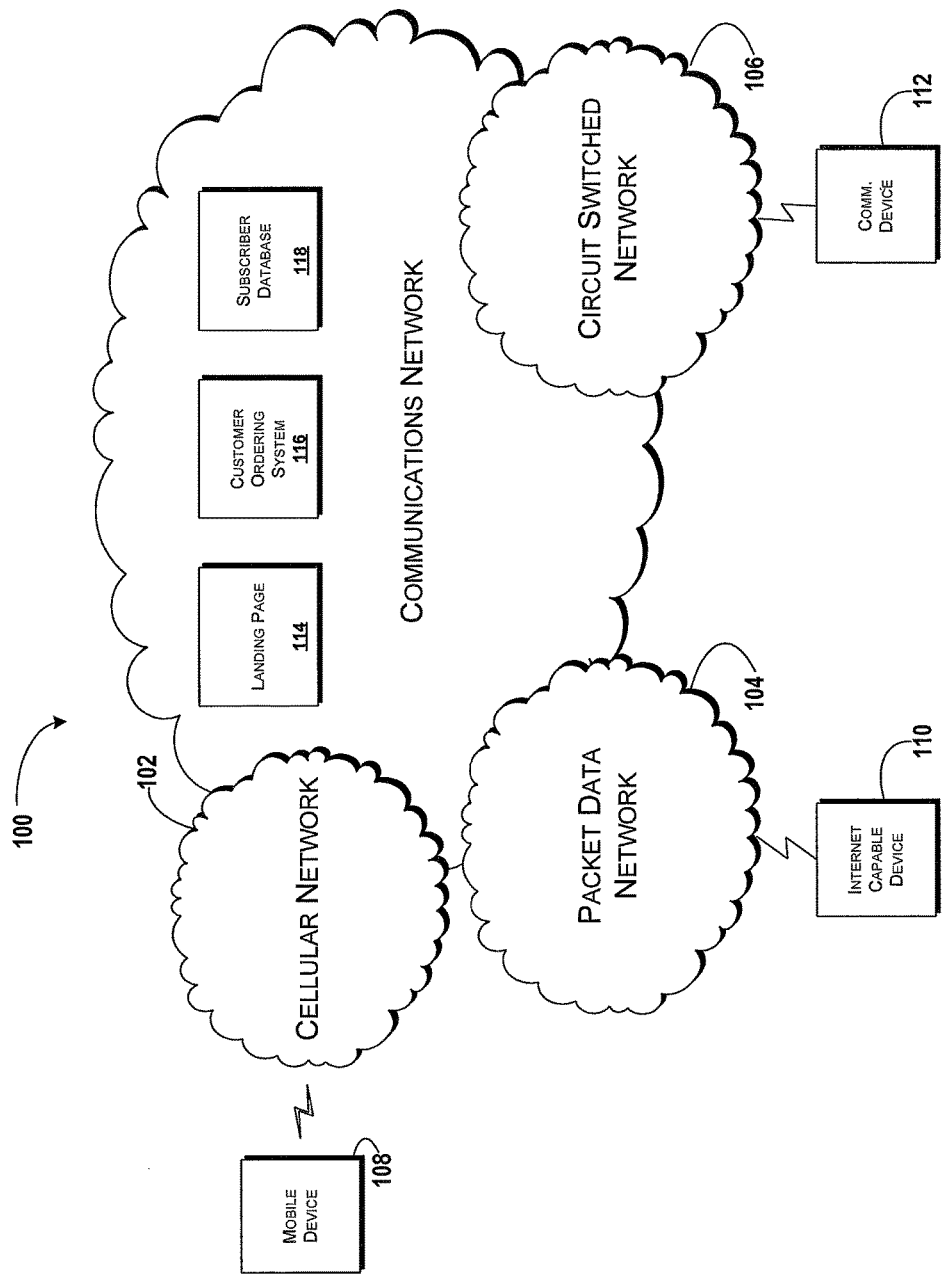
FIG. 1 schematically illustrates an exemplary communications network with which embodiments of the present disclosure can be implemented.

Referring now to the drawings in which like numerals represent like elements throughout the several views, FIG. 1 schematically illustrates an exemplary communications network 100. The communications network 100 can include a cellular network 102, a packet data network 104, for example, the Internet (Internet), and a circuit switched network 106, for example, a publicly switched telephone network (PSTN). The cellular network 102 can include various components such as, but not limited to, base transceiver stations (BTS's), Node-B's, base station controllers (BSC's), radio network controllers (RNC's), mobile switching centers (MSC's), short message service centers (SMSC's), multimedia messaging service centers (MMSC's), home location registers (HLR's), visitor location registers (VLR's), charging platforms, billing platforms, voicemail platforms, GPRS core network components, location service nodes, Internet protocol multimedia subsystem (IMS), and the like. The cellular network 102 can also include radios and nodes for receiving and transmitting voice, data, and combinations thereof to and from radio transceivers, networks, and the Internet 104. A device 108, such as, for example, a cellular telephone, a user equipment, a mobile terminal, a PDA, a laptop computer, a handheld computer, or a combination thereof, can be operatively connected to the cellular network 102.

The cellular network 102 can be configured as a 2G GSM (Global System for Mobile communications) network, and can provide data communications via GPRS (General Packet Radio Service) and EDGE (Enhanced Data rates for GSM Evolution). Additionally, the cellular network 102 can be configured as a 3G UMTS (Universal Mobile Telecommunications System) network and can provide data communications via the HSPA (High-Speed Packet Access) protocol family, for example, HSDPA (High-Speed Downlink Packet Access), EUL (Enhanced Uplink) or otherwise termed HSUPA (High-Speed Uplink Packet Access), and HSPA+ (Evolved HSPA). The cellular network 102 is also compatible with future mobile communications standards including, but not limited to, pre-4G and 4G, for example.

The illustrated cellular network 102 is shown in communication with the Internet 104 and a PSTN 106, though it should be appreciated that this is not necessarily the case. One or more Internet-capable devices 110, for example, a PC, a laptop, a portable device, a device 108, a smart phone, or any other suitable device, can communicate with one or more cellular networks 102, and devices 108 connected thereto, through the Internet 104. It also should be appreciated that the Internet-capable device 110 can communicate with the Internet 104 through the PSTN 106, the cellular network 102, or a combination thereof. As illustrated, a communications device 112, for example, a telephone, facsimile machine, modem, computer, or the like, can be in communication with the PSTN 106, and therethrough to the Internet 104 and/or the cellular network 102. It should be appreciated that the communications device 112 can be an Internet-capable device, and can be substantially similar to the Internet-capable device 110.

As illustrated, the communications network 100 can include one or more landing pages 114, one or more customer ordering systems 116 (COS's), and/or one or more subscriber databases 118. The landing page 114 can be a file such as, for example, a web page, and can be stored on a server or other device located on the cellular network 102, the Internet 104, and/or elsewhere on the communications network 100. In some embodiments, the landing page 114 is an Internet web page, or other file, stored on the COS 116.

The COS's 116 can be hardware, software, and/or a combination thereof, and can be in communication with, and/or can reside upon, the cellular network 102, the Internet 104, the PSTN 106, and/or the device 108. In some embodiments, the COS 116 is a server that is in communication with, or resides on, the Internet 104. In some embodiments, the functionality of the COS 116 is performed by a combination of software and hardware devices residing on the communications network 100.

The subscriber databases 118 can be software, hardware, and/or a combination thereof, and can be in communication with, and/or can reside upon, the cellular network 102, the Internet 104, the PSTN 106, or elsewhere on the communications network 100. In some embodiments, the subscriber database 118 includes one or more nodes including, but not limited to, a home location register (HLR) of the cellular network 102. In some embodiments, the subscriber database 118 is a database operating on the Internet 104, the PSTN 106, and/or elsewhere on the communications network 100.

It should be appreciated that substantially all of the functionality described with reference to the communications network 100 can be performed by the cellular network 102 alone, or in combination with other networks, network elements, and the like, including the illustrated networks, and some elements that are not illustrated. As will be explained in more detail below, some or all functions of the landing page 114 and the COS's 116 can reside on a device such as, for example, the device 108, a server on the Internet 104, an Internet-capable device 110, and/or a communications device 112. Additionally, a user's subscription and/or account information can be stored in a memory location associated with the device 108 such as, for example, a memory and/or subscriber identification module (SIM) of the device 108.

Figure 2:
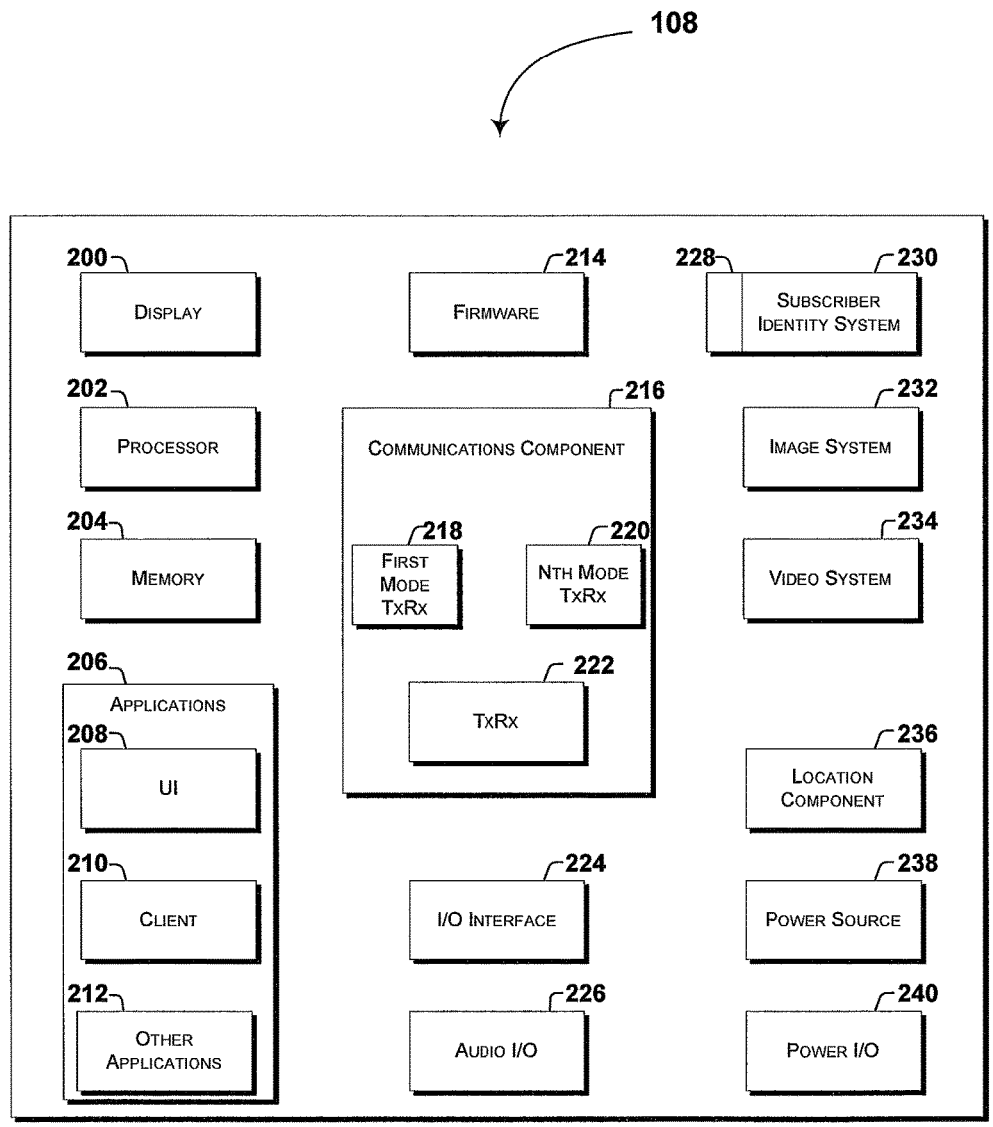
FIG. 2 schematically illustrates a block diagram of an exemplary mobile device for use with exemplary embodiments of the present disclosure.

FIG. 2 illustrates a schematic block diagram of an exemplary device 108 for use in accordance with some exemplary embodiments of the present disclosure. Although no connections are shown between the components illustrated in FIG. 2, the components can interact with each other to carry out device functions.

It should be understood that FIG. 2 and the following description are intended to provide a brief, general description of a suitable environment in which the various aspects of some embodiments of the present disclosure can be implemented. While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The device 108 can be a multimode headset, and can include a variety of computer readable media, including volatile media, non-volatile media, removable media, and non-removable media. The term "computer-readable media" and variants thereof, as used in the specification and claims, can include storage media and communication media. Storage media can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 108.

The device 108 can include a display 200 for displaying multimedia such as, for example, text, images, video, telephony functions such as Caller ID data, setup functions, menus, music, metadata, messages, wallpaper, graphics, Internet content, advertisements, device status, preferences settings, map and location data, and the like. The device 108 can include a processor 202 for controlling, executing, and/or processing data. A memory 204 can interface with the processor 202 for the storage of data and/or applications 206.

An application 206 can include, for example, web browsing software, text input software, mapping software, audio player software, video playback software, voicemail software, audio playback software, music player software, email software, messaging software, combinations thereof, and the like. The applications 206 can also include a user interface (UI) application 208. The UI application 208 can interface with a client 210 (e.g., an operating system) to facilitate user interaction with device functionality and data, for example, answering/initiating calls, entering/deleting data, configuring settings, address book manipulation, multimode interaction, and the like. The applications 206 can include other applications 212 such as, for example, firmware, visual voicemail software, add-ons, plug-ins, voice processing, voice recording, messaging, email processing, video processing, image processing, archival applications, music playback, combinations thereof, and the like, as well as subsystems and/or components. The applications 206 can be stored in the memory 204 and/or in a firmware 214 as executable instructions, and can be executed by the processor 202. The firmware 214 can also store code for execution during initialization of the device 108.

A communications component 216 can interface with the processor 202 to facilitate wired/wireless communications with external systems including, for example, cellular networks, location systems, VoIP networks, local area networks (LAN's), wide area networks (WAN's), metropolitan area networks (MAN's), personal area networks (PAN's), and other networks, which can be implemented using WIFI®, WIMAX®, combinations and/or improvements thereof, and the like. The communications component 216 can also include a multimode communications subsystem for providing cellular communications via different cellular technologies.

For example, a first cellular transceiver 218 can operate in one mode, for example, GSM, and an Nth transceiver 220 can operate in a different mode, for example UMTS. Although only two transceivers 218, 220 are illustrated, it should be appreciated that more than two transceivers can be included in the device 108. The communications component 216 can also include a transceiver 222 for unlicensed communications using technology such as, for example, WIFI®, WIMAX™, BLUETOOTH®, infrared, infrared data association (IRDA), near field communications (NFC), other radio frequency (RF) applications, and the like. The communications component 216 can also facilitate communications reception from terrestrial radio networks, digital satellite radio networks, Internet-based radio services networks, combinations thereof, and the like. The communications component 216 can process data from a network such as, for example, the Internet, a corporate intranet, a home broadband network, and the like, via an internet service provider (ISP), a digital subscriber line (DSL) provider, a cable provider, and/or a broadband provider.

An input/output (I/O) interface 224 can be provided for input/output of data and/or signals. The I/O interface 224 can be a hardwire connection, such as, for example, a USB port, a mini-USB port, an audio jack, a PS2 port, an IEEE 1394 port, a serial port, a parallel port, an Ethernet (RJ48) port, a telephone (RJ11) port, and the like, and can accept other I/O devices such as, for example, keyboards, keypads, mice, interface tethers, stylus pens, printers, thumb drives, touch screens, multi-touch screens, touch pads, trackballs, joy sticks, microphones, remote control devices, monitors, displays, liquid crystal displays (LCD's), combinations thereof, and the like. It should be appreciated that the I/O interface 224 can be used for communications between the device and a network or local device, instead of, or in addition to, the communications component 216.

Audio capabilities can be provided by an audio I/O component 226 that can include a speaker for the output of audio signals and a microphone to collect audio signals. The device 108 can include a slot interface 228 for accommodating a subscriber identity system 230 such as, for example, a SIM or universal SIM (USIM). The subscriber identity system 230 instead can be manufactured into the device 108, thereby obviating the need for a slot interface 228. In some embodiments, the subscriber identity system 230 can store certain features, account information, user information, rules, policies, models, and the like. The subscriber identity system 230 can be programmed by a manufacturer, a retailer, a customer, a network operator, and the like.

The device 108 can include an image capture and processing system 232 (image system). Photos and/or videos can be obtained via an associated image capture subsystem of the image system 232, for example, a camera. The device 108 can also include a video system 234 for capturing and recording video content. The video system 234 can provide video data to various applications 206, such as, for example, video teleconferencing applications, video compression applications, video messaging applications, video sharing applications, and the like.

A location component 236, can be included to send and/or receive signals such as, for example, GPS data, A-GPS data, WIFI®, WIMAX™, cellular network triangulation data, and/or combinations thereof, and the like. The location component 236 can interface with cellular network nodes, telephone lines, satellites, location transmitters and/or beacons, wireless network transmitters and receivers, for example, WIFI hotspots, radio transmitters, combinations thereof, and the like. The device 108 can obtain, generate, and/or receive data to identify its location, or can transmit data used by other devices to determine the device 108 location. The device 108 can include a power source 238 such as batteries and/or other power subsystems (AC or DC). The power source 238 can interface with an external power system or charging equipment via a power I/O component 240.

Figure 3:
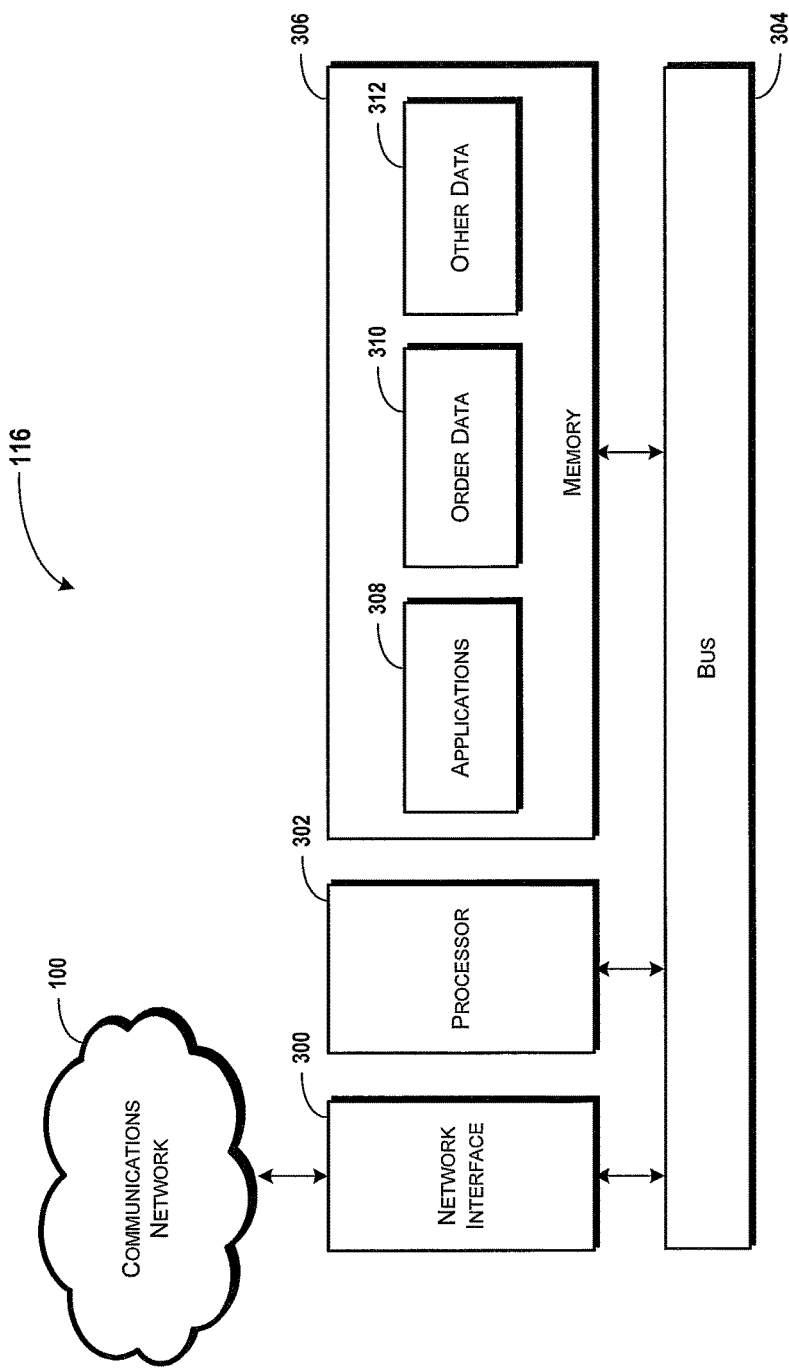
FIG. 3 schematically illustrates a customer ordering system, according to an exemplary embodiment of the present disclosure.

FIG. 3 schematically illustrates a block diagram of a COS 116 according to an exemplary embodiment of the present disclosure. The COS 116 can be a combination of hardware and software, and can exist as a node on a communications network 100, and as a hardware/software module on a device such as the illustrated device 108. The illustrated COS 116 includes one or more network interfaces 300 that are operatively linked and in communication with one or more processors 302 via one or more data/memory busses 304. The network interface 300 can be used to allow the COS 116 to communicate with one or more components of the communications network 100, or any device connected thereto or residing thereon. For example, the COS 116 can communicate with a subscriber database 118, as will be explained in more detail below. Similarly, the COS 116 can receive and/or transmit data to a system hosting the landing page 114, for example. The processor 302 is operatively linked and in communication with one or more memory devices 306 via the data/memory bus 304.

The word "memory," as used herein to describe the memory 306, collectively includes all memory types associated with the COS 116 such as, but not limited to, processor registers, processor cache, random access memory (RAM), other volatile memory forms, and non-volatile, semi-permanent or permanent memory types; for example, tape-based media, optical media, flash media, hard disks, combinations thereof, and the like. While the memory 306 is illustrated as residing proximate the processor 302, it should be understood that the memory 306 can be a remotely accessed storage system, for example, a server on the Internet 104, a remote hard disk drive, a removable storage medium, combinations thereof, and the like. Moreover, the memory 306 is intended to encompass network memory and/or other storage devices in wired or wireless communication with the COS 116, which may utilize the network interface 300 to facilitate such communication. Thus, any of the data, applications, and/or software described below can be stored within the memory 306 and/or accessed via network connections to other data processing systems (not shown) that may include a local area network (LAN), a metropolitan area network (MAN), or a wide area network (WAN), for example.

Accordingly, the present disclosure may operate on the COS 116, wherein the COS 116 is configured as a server to one or more client data processing systems as dictated by a client/server model. It should be appreciated that the memory 306 can also be a storage device associated with the device 108. The illustrated memory 306 can include one or more applications 308, order data 310, and/or other data 312.

The applications 308 can include various programs, routines, subroutines, algorithms, software, tools, and the like ("instructions"), for fulfilling order requests made by users. For example, the applications 308 can be used to recognize data received from the landing page 114, for example, hidden form information, to identify a supplier, a product, and other details about an advertisement that is linked to, i.e., that includes instructions for directing traffic to, the COS 116. Similarly, the applications 308 can further include instructions that retrieve information needed to fulfill order requests. In some embodiments, the COS 116 can communicate with one or more subscriber databases 118 to retrieve account information associated with a user. Similarly, the COS 116 can receive user identification information from the landing page 114, a device 108, a node of the cellular network 102, or other network systems, for purposes of identifying the user placing the order request. These and other functions of the COS 116 will be described in more detail below with reference to FIG. 4-7.

The applications 308 can also include instructions used to operate the COS 116 and/or devices connected to the COS 116, if any. The instructions can include, for example, operating systems, firmware, drivers for peripherals, and the like. The applications 308 can also include, for example, authentication software, billing applications, user interface (UI) applications, usage tracking applications, and the like.

The order data 310 can include information relating to order requests made and/or received by the COS 116. For example, if a user requests an order through the COS 116, the COS 116 can store data relating to the user, the product ordered, the time and date of the order, amounts due for the order, if any, the supplier or other party who will fill the order, account information, and the like. In some embodiments, the COS 116 stores device data associated with orders placed through the COS 116. For example, the order data 310 can include data that identifies a device used to connect to the communications network 100, for example, an international mobile subscriber identity (IMSI), an international mobile equipment identity (IMEI), a telephone number, an IP address, an email address, and the like. As will be explained in more detail below, the COS 116 can use the data that identifies the user/device to retrieve contact information for fulfilling the orders. The user/device data can also be used for fraud protection, billing purposes, and the like.

The other data 312 can include, for example, billing information, billing applications, Internet web pages, advertisements, flash animations, landing pages, order request applications, account data, user device data, software, programs, algorithms, hardware data, and the like. The other data 312 can also include account/device data that relates to a user's account and/or to one or more devices 108. The account/device data can include, but is not limited to, the user's subscription plan, subscription features, and/or the capabilities of the user's device 108.

The COS 116 can be in communication with one or more billing platforms, and/or other network nodes, to receive the account/device data relating to a user's subscription plan, usage, and billing information. Additionally, the account/device data can inform the COS 116 of the features the user's device 108 supports by indicating one or more of the IMSI or the IMEI, the serial number, a carrier, a software version(s), firmware information, one or more carrier-specific applications, combinations thereof, and the like. As such, the account device data can indicate if the device 108 supports WIFI®, 3G, 2G, EDGE, GPS, A-GPS, network triangulation, BLUETOOTH®, NFC, web formats, audio formats, video formats, data transfer of audio files and video files, and the like. Additionally, the account/device data can indicate whether services for the device 108 are charged/billed on a pre-paid and/or post-paid basis, or if features are available on the device 108.

The account/device data can pass-through the COS 116, or can be stored, at least temporarily, by the COS 116. Additionally, billing, privacy, safety, and/or other concerns can be used to tailor functionality of the COS 116 through the account/device data. For example, a user can disable the functionality of the COS 116 and store a preference indicating disablement of the COS 116 as an account setting stored in the account/device data. Additionally, the COS 116 can use billing information to adjust functionality of the COS 116. For example, a notification can be sent from a billing platform to the COS 116 and the COS 116 can disable functionality automatically. A user can be given the ability to override deactivation of some, none, or all desired features and/or functionality of the COS 116.

The other data 312 can also include a billing module (not illustrated) that can be used to track, collect, and/or report activities of the COS 116 to a billing system at the COS 116, or elsewhere on the communications network 100 for billing purposes. It should be understood that if the COS 116 resides on one or more devices, the billing module can be a combination of hardware and software reside elsewhere on the communications network 100.

The billing module can track, for example, how much data is sent and received by the COS 116, and can report this information to a billing and/or charging system of the communications network 100, for example. Billing and/or charging can be pre-paid or post-paid. The functionality of the COS 116 can be charged on any desired basis, including, but not limited to, a per-use basis, as a flat fee, as part of service package, or the like. In some embodiments, the billing module can be used for providing payment processing functionality for the COS 116. For example, the billing module can store one or more payment accounts associated with a user, and can provide payment information to the COS 116 if payment is requested for an order placed by a user. Additionally, some promotions can include, for example, free accessories if a service contract is extended. If a user decides to extend a service contract, the billing module can update a user's account information accordingly.

As explained briefly above, the COS 116 can reside on one or more mobile devices such as, for example, the device 108. As such, it should be understood that some or all of the applications 308, the order data 310, and the other data 312 can be stored in a memory 204 of the device 108. Some or all of the applications 308 can be stored as the applications 206 of the device 108. Similarly, as mentioned above, some or all functionality of the applications 308 can be stored at, and/or performed by, one or more servers or other nodes on the communications network 100. Similarly, the processor 302 can be the processor 202 of the device 108, or a node of the communications network 100. Additionally, the network interface 300 can be a communications component of the device 108, for example, a short range radio device, a transceiver, a receiver, a transmitter, antennae, or combinations thereof, or a connection at a server or other node of the communications network 100.

Figure 4:
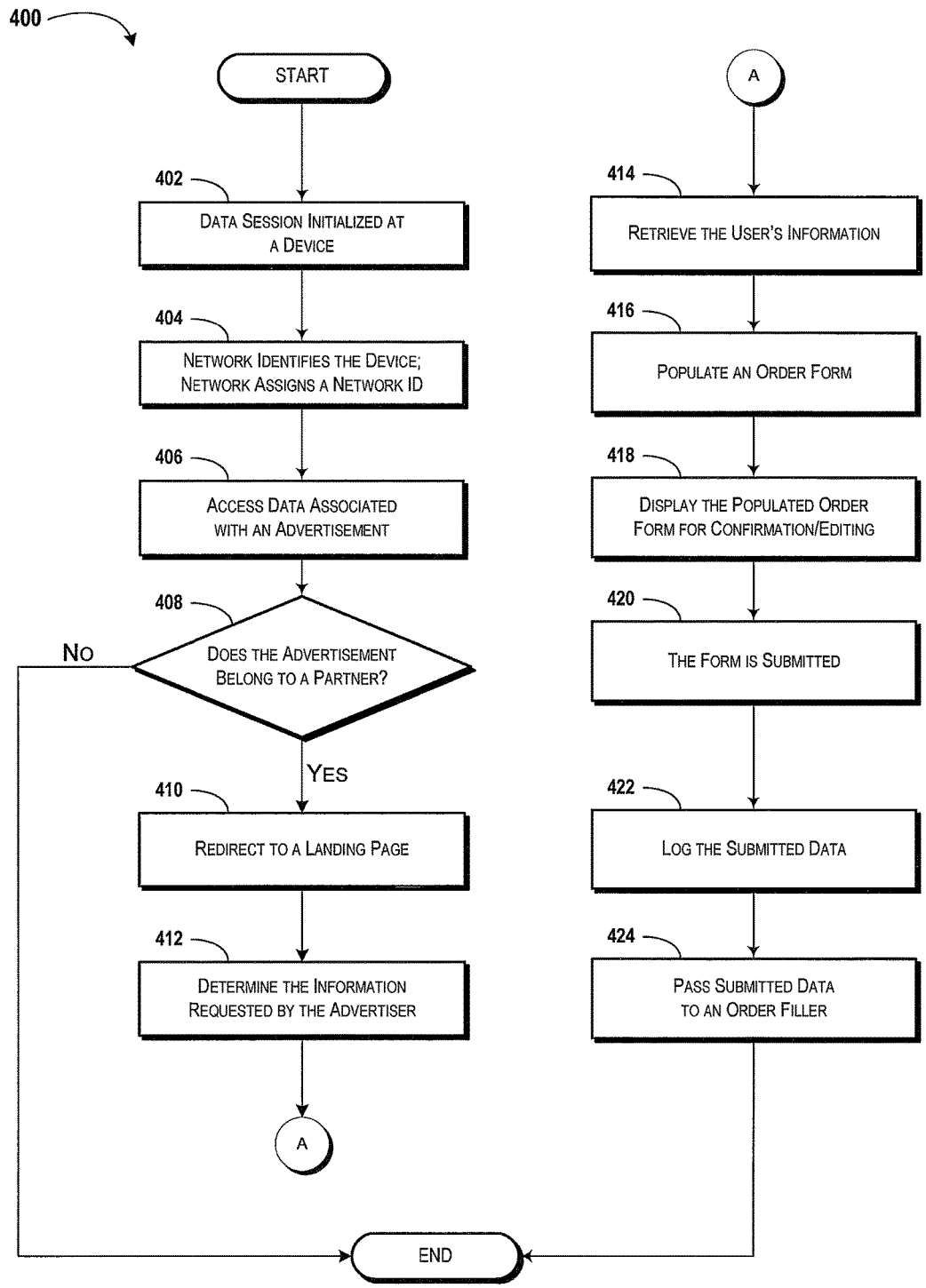
FIG. 4 schematically illustrates a method for providing direct shipping to mobile subscribers, according to an exemplary embodiment of the present disclosure.

FIG. 4 schematically illustrates a method 400 for providing direct shipping to a mobile subscriber, according to an exemplary embodiment of the present disclosure. It should be understood that the steps of the method 400 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 400 can be ended at any time. Some or all steps of this process, and/or substantially equivalent steps, can be performed by execution of computer-readable instructions included on a computer readable medium.

The method 400 begins, and flow proceeds to block 402, wherein a data session is initialized at a device on the communications network 100. For purposes of illustration, and not limitation, the data session can be initialized at the device 108, which can be operating on a cellular network 102. The device 108 can, for example, negotiate a packet data protocol (PDP) context for transfer of packet data over the cellular network 102. Other data transfer protocols and delivery methods are possible.

As illustrated at block 404, the cellular network 102 can identify the device 108. In some embodiments, the cellular network 102 can associate a network ID with the device 108, or a user thereof, for identification purposes. If the data session is initialized for web browsing, for example, the network ID can be used to identify the device 108 when communicating with other nodes of the communications network 100. For example, the network ID can be used by a web server to log activity of the device 108. While the web server may not know the identity of a user of the device 108, the network ID can be stored by the web server and may be used to trace network activity to the device 108 at a later time, if necessary, by authorized entities. The network ID can be, for example, an alphanumeric string or character. The network ID can be associated with device/account data such as, for example, the IMEI of the device 108, the user of the device 108, the IMSI of the device 108, data stored by a device SIM 230, and the like.

At some time, the device 108 can access data that includes one or more advertisements. The accessed data can include a game, a video, an application, a web page, an MMS message attachment, an email attachment, and the like. The advertisement can include graphics, text, JAVA scripts, embedded objects, and the like, and can include links to sites, applications, and/or nodes associated with, or operated by, an advertiser. For purposes of illustration, and not limitation, the advertisement is illustrated and described as a banner advertisement on a web page that is accessed by the device 108. The advertisement can include an offer to the user of the device 108. For example, the advertisement can advertise a sample of a product that can be obtained by "clicking," or otherwise indicating interest in, the advertisement and inputting a shipping address at a web site associated with the advertiser. The term "click" is used to indicate some input at the device 108 that instructs the device 108 to follow one or more links included in the advertisement. The input can include text selection, image selection, entry of a web address, entry of a coupon code, selection of an option to visit an advertiser, and the like. As illustrated at block 406, the device 108 can receive input indicating a user's desire to learn more about information displayed by an advertisement.

According to some embodiments of the present disclosure, advertisers can partner with network operators such as, for example, wireless carriers, to provide the advertisers' advertisements to wireless subscribers. In some embodiments, a network operator can provide the functionality of the COS 116 to an advertising partner, if desired. As such, some advertisements viewed on the device 108 can belong to advertising partners of a network operator. As illustrated at block 408, the advertisement can be analyzed to determine if the advertisement belongs to an advertising partner. An advertisement can be recognized as an advertisement of an advertising partner by recognition of an included link or other embedded information. The advertisements can include, for example, a link to a landing page 114 or other location that is operated by a network operator or a third party affiliated with the network operator and/or the advertiser. The COS 116 can recognize the link to the landing page 114 and determine that the advertisement belongs to an advertising partner. If the COS 116 so determines, the method 400 can proceed to block 410, wherein the device 108 can be redirected to the landing page 114. If the COS 116 does not determine that the advertisement belongs to an advertising partner, then clicks on the advertisement can be handled in another and/or in a default manner, and the method 400 can end.

Returning now to block 410, if it is determined that the advertisement belongs to an advertising partner, the device 108 can be redirected to a landing page 114 for completing of the transaction. The landing page 114 can include, for example, a hypertext markup language (HTML) page, an extensible hypertext markup language (XHTML) page, a wireless markup language (WML) page, as well as other content such as files scripted or coded in, for example, JAVA, JavaServer Pages (JSP), Active Server Pages (ASP), personal home page (PHP), common gateway interface (CGI), Perl code, and the like. The landing page 114 can be a page tailored to each advertisement, or can be a dynamic web page that is automatically tailored based upon information received from the COS 116. For example, the advertisement can include hidden or embedded data that indicates to the COS 116, the advertiser, a coupon, a product, a product size, a product cost, or other information. The web server, or another node on the communications network 100, can use the received data to tailor the landing page 114.

As illustrated at block 412, the COS 116 can determine what information is requested by the advertiser to complete the transaction. The COS 116 can make this determination based upon, for example, the advertiser, the product, the coupon, the advertisement, and/or stored data relating to the advertiser, product, coupon, and/or advertisement. For example, the advertisement can also include hidden or embedded data that indicates to the web server what information is requested by the advertiser to complete a transaction. Additionally, or alternatively, the COS 116 can store a list of requested information in a memory location such as, for example, the other data 312. When the COS 116 receives an order request relating to a particular product, coupon, or advertiser, the COS 116 can retrieve data from the memory 306 to determine what information is used to complete a transaction with the advertiser. For example, if the advertisement offers free samples of a product, the advertiser may request an address, name, telephone number, email address, age, sex, citizenship, legal residence information, and/or other data relating to the user, to use for shipping the advertised sample to the user. The landing page 114 can be tailored to include a form that prompts the user for entry of the requested information.

As illustrated at block 414, the COS 116 can retrieve the information requested by the advertiser. It should be understood that the details as to what information is requested, what information is required, and what information is optional, can all be stored by the COS 116, or a storage device associated with the COS 116. The information can be retrieved from a number of locations.

In some embodiments, the COS 116 retrieves the information from one or more subscriber databases 118, e.g., a home location register (HLR) of a cellular network 102, a billing platform of a cellular network 102, an account database, and/or other platforms, modules, and/or databases. The subscriber database 118 can be responsible for storing account, user, and/or billing information for users of a network such as the cellular network 102. The subscriber database 118 can store accurate and current information for a user. As such, information retrieved from the subscriber database 118 can be accurate and current for the user. In some embodiments, the information can be stored in a user order information database located on the communications network 100. In some embodiments, the COS 116 uses information relating to the device 108 to query an information database associated with the device 108. In some embodiments, the COS 116 queries the device 108 for some or all of the information. For example, the COS 116 can query the device, or instruct a network node to query the device 108, for information stored in a device memory 204 or SIM 230.

As illustrated at block 416, the COS 116, or a web server in communication with the COS 116, can populate the order form with information from the account associated with the device 108. In some embodiments, the COS 116 hosts the landing page 114, and the COS 116 inputs the user's data in the order form prior to uploading the landing page 114 to the device 108. In some embodiments, the COS 116 communicates with a node hosting the landing page 114, and instructs the hosting device as to what information is needed for display.

As illustrated at block 418, the populated order form can be displayed for a user to confirm and/or edit prior to submitting the order form. Since the COS 116 can populate the order form, the user may not need to edit any data in the order form. In some embodiments, however, some of the data can be optionally entered and/or removed by a user for security, privacy, legal, and/or other considerations. The user can be prompted to review or confirm the data entered by the COS 116 to ensure that the information is current and correct, and also to provide the user with notice that the information will be passed to a third party such as, for example, an advertiser.

At block 420, the order form is submitted. The form can be submitted electronically, for example, by using a submit option of an HTML form. It should be appreciated that the action called for by the HTML form can include using an HTML "post" or "get" method to, for example, post the information to a dynamic page that interfaces with a database. For example, the HTML form information can be submitted to an order log that uses, for example, SQL to communicate with a database for logging orders. As explained above in more detail, the form can be coded and/or scripted in other languages, and the form can include executable code that handles logging and reporting of orders without interfacing with another entity.

As illustrated at block 422, the submitted data ("orders") can be logged by the COS 116 at a storage location. The storage location can include, for example, the memory 306 of the COS 116. More particularly, the orders can be logged in the order data 310 of the COS 116. It should be appreciated that the order data 310 can be an external database, a local memory, and/or another storage location associated with the COS 116 and/or the communications network 100.

As illustrated at block 424, the COS 116 can pass the orders to the advertiser, or to another third party, for order fulfillment. In some embodiments, the orders are passed to an order-filling entity immediately upon receipt by the COS 116. In some embodiments, the orders are passed to the order-filling entity one or more times per day, week, and/or month. In other embodiments, the orders are passed to the order-filling entity when a certain number of orders are received. Although not illustrated in FIG. 4, the order-filling entity can fulfill the orders. The method 400 ends.

Figure 5:
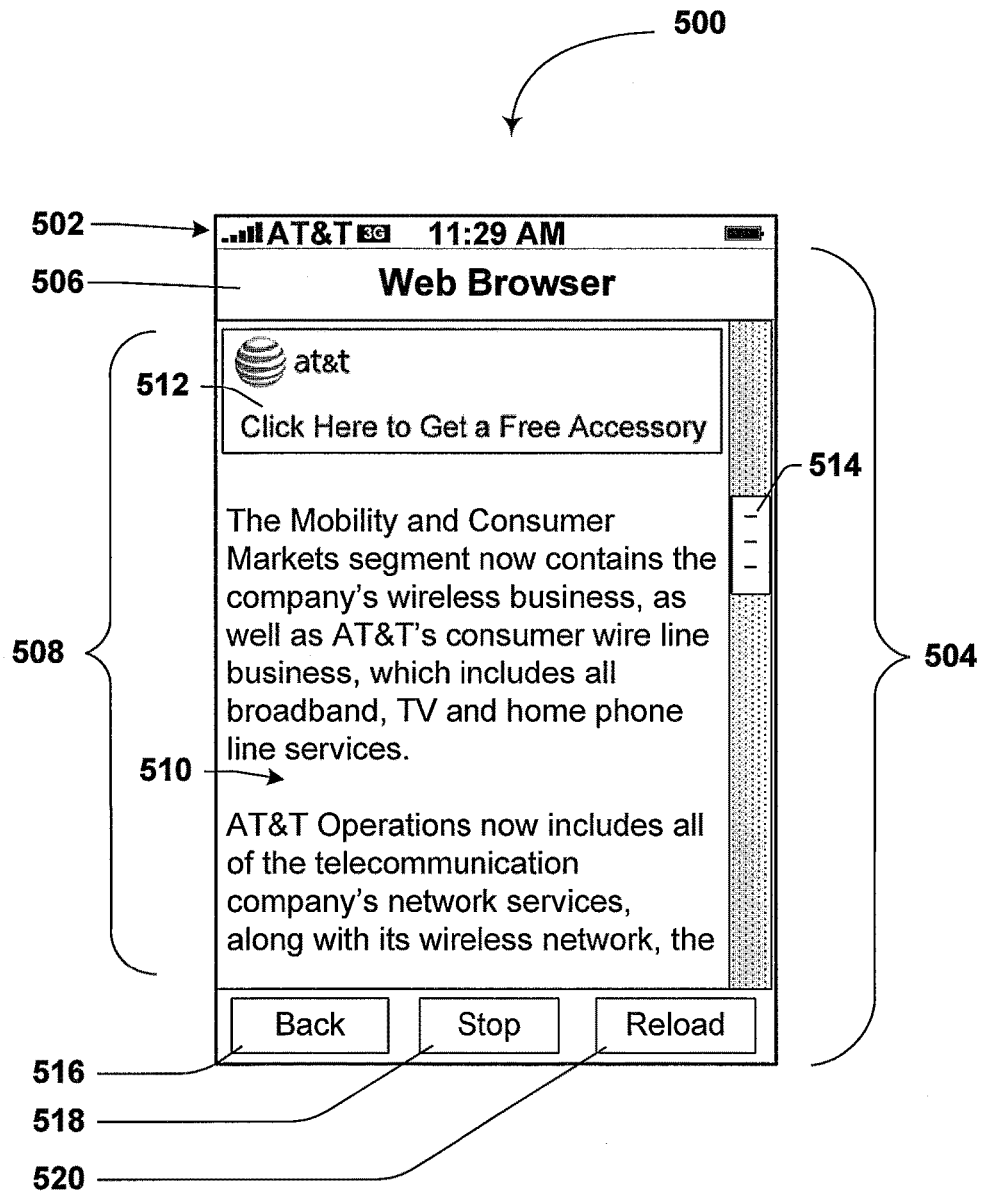
FIG. 5 illustrates a graphical user interface (GUI) for providing an interface for viewing Internet content, according to an exemplary embodiment of the present disclosure.

FIG. 5 illustrates an exemplary GUI 500 for a device 108, according to an exemplary embodiment of the disclosure. In some embodiments, the GUI 500 is displayed by a video output source on a display 200 of a device 108. As illustrated, the GUI 500 can include operational information 502 for the device 108. The operational information 502 can include network information, for example, a signal meter for displaying the measured strength of a network signal, and information relating to the network with which the device 108 is in communication. In the illustrated GUI 500, the device 108 is indicating maximum signal strength, and that the device 108 is currently connected to the AT&T third generation (3G) network. This indication is exemplary only, and the GUI 500 can be used on devices operating on other networks, other protocols, other standards, and/or operated by other carriers. The operational information 502 can also include, for example, the time of day, a date, a message waiting indicator, a battery meter, a short range radio communications device indicator, an alarm indicator, other information, and the like.

The GUI 500 includes a web browser interface 504 for viewing content on, for example, the Internet 104. The web browser interface 504 can include a title portion 506 for indicating to a user the function currently being performed by the device 108. The web browser interface 504 can also include Internet content 508.

The Internet content 508 is illustrated as including an article 510, an advertisement 512, and a scroll bar 514. The article 510 can be an Internet file, for example, a text-based news article, as illustrated. The advertisement 512 can include text, graphics, hyperlinks, and the like, and can link to advertisers' web sites, third party web sites, a landing page 114, and/or a COS 116, for example. The scroll bar 514 can allow a user to "scroll" up and down through the article 510. Although not illustrated in FIG. 5, the web browser interface 504 can include scroll bars for "scrolling" right and left as well as, or instead of, the illustrated scroll bar 514.

In some embodiments, the advertisements 512 can include embedded data such as, for example, hidden hypertext markup language (HTML), extensible HTML (XHTML), and/or wireless markup language (WML) form data, for "post" and "get" method actions at other web sites. The advertisements 512 can also be coded or scripted in other languages/scripts, such as, for example, JavaServer Pages (JSP), ColdFusion®, Active Server Pages (ASP), common gateway interface (CGI) scripts, JAVA® scripts, Perl code, C++ code, C code, personal home page (PHP), and the like. Embedded data can be passed to other entities, for example, web servers and COS's 116, and other actions can be performed by the other entities based upon, or in response to, the data received.

For example, an advertisement 512 can include hidden form data that indicates, for example, the name of the product advertised, the web site or address at which the advertisement 512 is displayed, information needed by a supplier to send a user an advertised product, product sample, and/or coupon, the internet protocol (IP) address of the device executing the code, prices and/or shipping charges for mailing to the user the product, product sample, and/or coupon, other information, and the like. These and other data can be received and logged by the COS 116 or other network elements for tracking, billing, commission payment, order fulfillment, and/or other purposes.

The web browser interface 504 can include various options, for example, an option 516 to go to previously viewed/retrieved Internet content, an option 518 to stop the loading of the currently displayed Internet content 508, an option 520 to reload the currently displayed Internet content 508, additional and/or alternative options (not illustrated), combinations thereof, and the like. It should be understood that the illustrated options 516, 518, 520 are exemplary only. Additional and/or alternative options are possible and contemplated.

Figure 6:
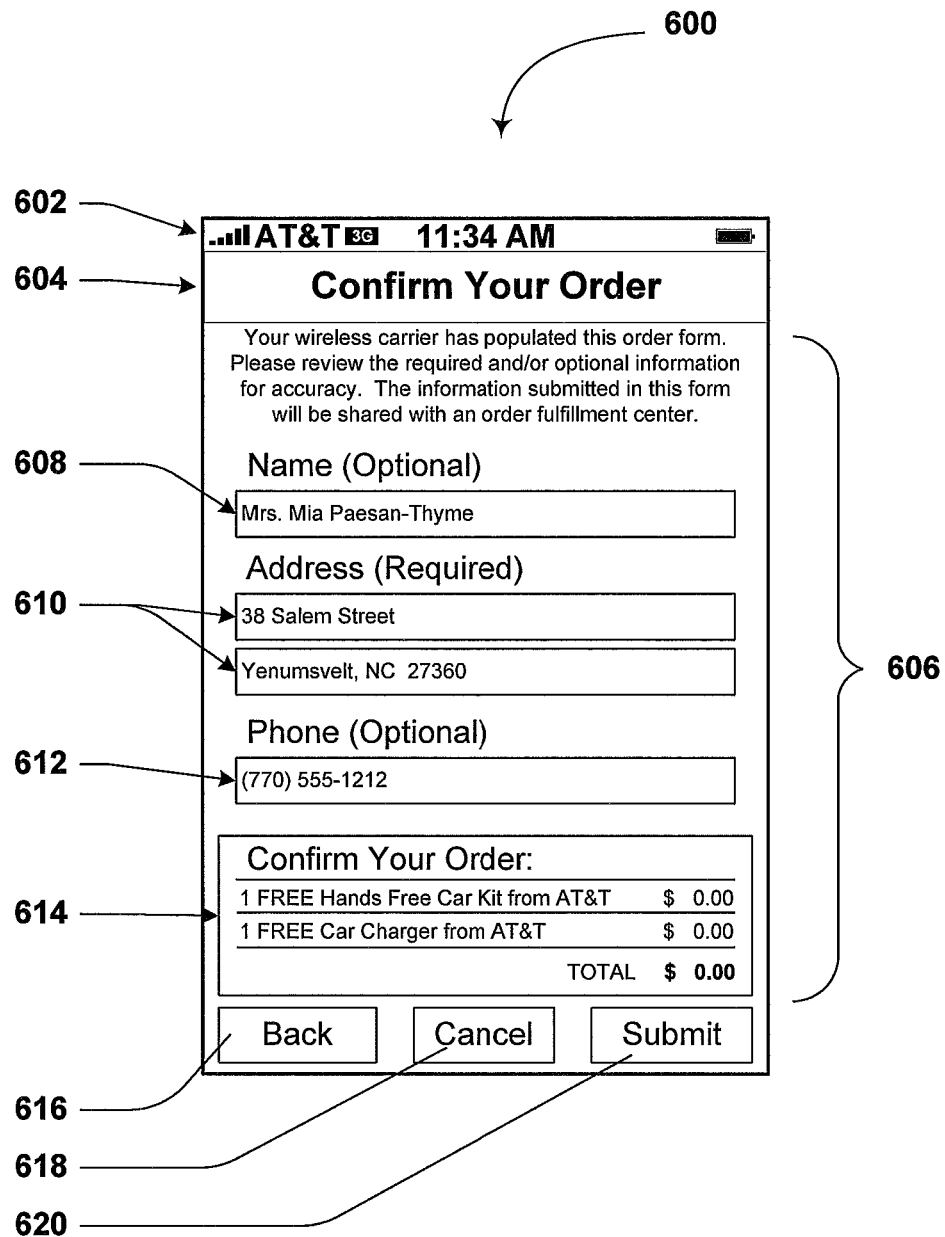
FIG. 6 illustrates a GUI for providing an interface for ordering products, according to an exemplary embodiment of the present disclosure.

FIG. 6 illustrates a GUI 600 for a device 108, according to another exemplary embodiment of the disclosure. In some embodiments, the GUI 600 is displayed by a video output source on a display 200 of a device 108. As illustrated, the GUI 600 can include operational information 602 for the device 108, as described above with reference to FIG. 5. The GUI 600 can include a title portion 604 for indicating to a user the function currently being performed by the device 108. In the illustrated embodiment, the title portion 604 informs the user that the GUI 600 is currently displaying an order confirmation interface 606.

The order confirmation interface 606 can include a form generated and/or populated by a COS 116. The order confirmation interface 606 can inform a user that the form has been automatically populated, and can give the user the option to tailor the information. The order confirmation interface 606 can also warn the user that the displayed information will be shared with a third party, if applicable.

The illustrated order confirmation interface 606 includes a name field 608 for entering and/or displaying the user's name. The name filed 608 can be labeled as optional, thereby informing the user that the name is not required by a third party to complete the transaction. Some users may wish to remove their name from the form to prevent sharing of their personal information with a third party. The illustrated order confirmation interface 606 can also include address fields 610 for entering and/or displaying a shipping address for the user. The information in the address fields 610 can be labeled as required, indicating to the user that the address is necessary to complete the order request. The user can edit the address, if desired.

Similarly, the order confirmation interface 606 can include a phone number field 612 for entering and/or displaying the user's telephone number. The phone number field 612 can be labeled as optional, thereby informing the user that the phone number is not required by a third party to complete the transaction. As explained above with reference to FIG. 4, the COS 116 can populate the form based upon information from the user's account, a subscriber database, or another network node. As such, the information loaded into the form is assumed to be accurate and current, but the user can be allowed to change the information, if desired. For example, the COS 116 can load the user's cellular telephone number into the telephone number field 612. A user may desire to share his home telephone number instead of his cellular telephone number. As such, the user can edit the contents of the telephone number field 612 to substitute his home telephone number.

As explained above, an advertisement can include hidden form data that indicates, for example, the name of the product advertised, information needed by a supplier to send a user a sample of the advertised product, prices and/or shipping charges for mailing the product, other information, and the like. These and other data can be received and logged by the COS 116 or other network elements for tracking, billing, commission payment, order fulfillment, and/or other purposes, and can be used to generate an order confirmation list 614 for user's review and submission. If desired, the order confirmation list 614 can be coded as an editable field. In some embodiments, the order confirmation list 614 is not editable.

The GUI 600 can include various options, for example, an option 616 to go to previously viewed/retrieved Internet content, an option 618 to cancel the order, an option 620 to submit the reviewed and confirmed order, additional and/or alternative options (not illustrated), combinations thereof, and the like. It should be understood that the illustrated options 616, 618, 620 are exemplary only. Additional and/or alternative options are possible and contemplated. It should also be appreciated that some, none, or all of the fields 608, 610, 612, 614 can be labeled and/or treated as optional or required. The illustrated labels are exemplary only.

Figure 7:
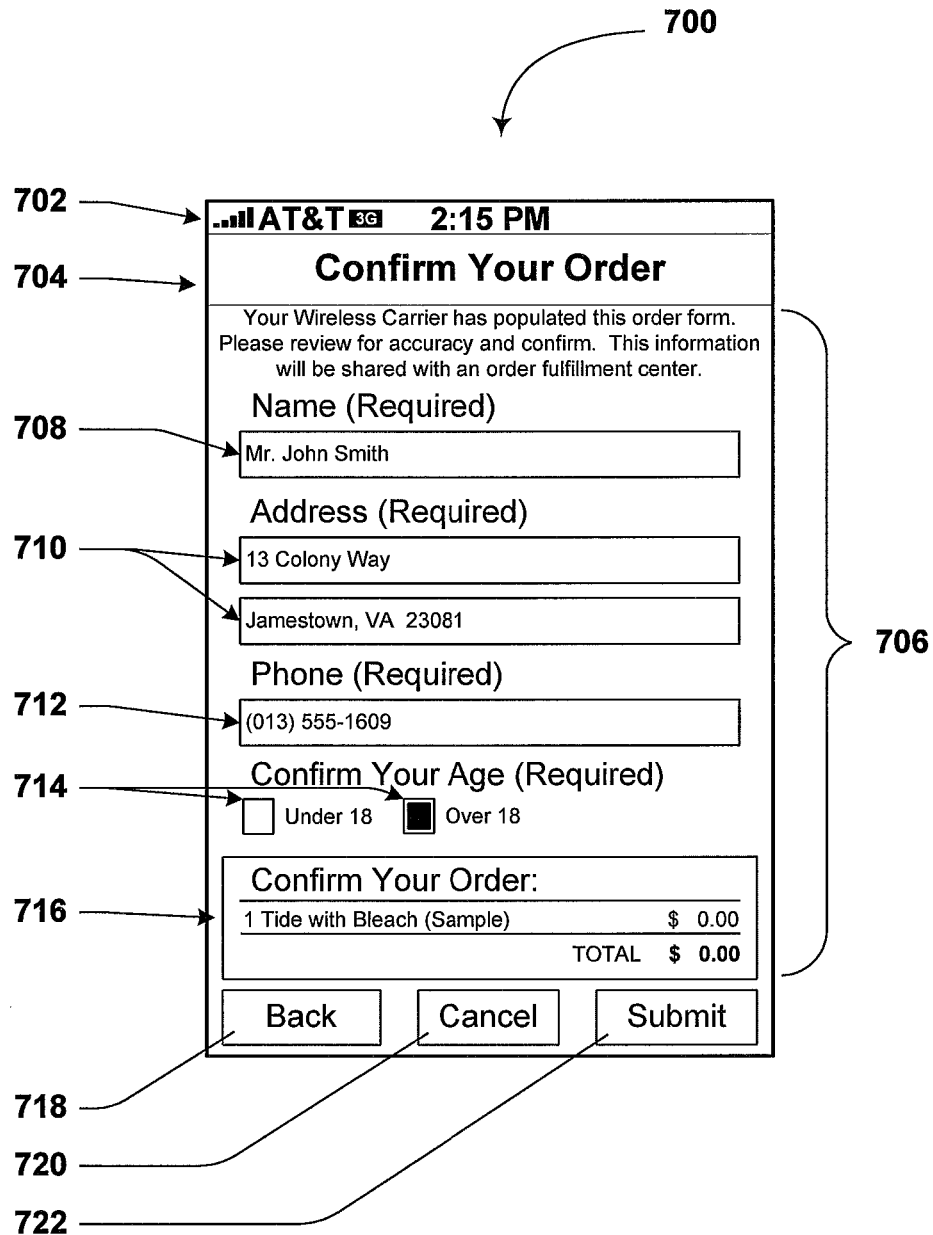
FIG. 7 illustrates a GUI for providing an interface for ordering products, according to another exemplary embodiment of the present disclosure.

FIG. 7 illustrates a GUI 700 for a device 108, according to yet another exemplary embodiment of the disclosure. In some embodiments, the GUI 700 is displayed by a video output source on a display 200 of a device 108. As illustrated, the GUI 700 can include operational information 702 for the device 108, as described above with reference to FIGS. 5 and 6. The GUI 700 can include a title portion 704 for indicating to a user the function currently being performed by the device 108. In the illustrated embodiment, the title portion 704 informs the user that the GUI 700 is currently displaying an order confirmation interface 706.

As explained above with reference to FIG. 6, the order confirmation interface 706 can include a form generated and/or populated by a COS 116. The order confirmation interface 706 can inform a user that the form has been automatically populated, and can give the user the option to tailor the information. The order confirmation interface 706 can also warn the user that the displayed information will be shared with a third party, if applicable.

The illustrated order confirmation interface 706 includes a name field 708 for entering and/or displaying the user's name. The name filed 708 can be labeled as required, thereby informing the user that the name is required by a third party to complete the transaction. The illustrated order confirmation interface 706 can also include address fields 710 for entering and/or displaying a shipping address for the user. The information in the address fields 710 can be labeled as required, indicating to the user that the address is necessary to complete the order request. In some embodiments, the user is allowed to edit the data in the name field 708 and/or the address fields 710, if desired. In some embodiments, the user is not allowed to edit the data in the name field 708 and/or the address fields 710.

Similarly, the order confirmation interface 706 can include a phone number field 712 for entering and/or displaying the user's telephone number. The phone number field can be labeled as required, thereby informing the user that the phone number is not required by a third party to complete the transaction. As explained above with reference to FIGS. 4-6, the COS 116 can populate the form based upon information from the user's account, a subscriber database, or another network node. As such, the information loaded into the form is assumed to be accurate and current, but some embodiments can allow the user to change data in the telephone number field 712, if desired. In some embodiments, the user is not allowed to change the data in the telephone number field 712.

The GUI 700 can also include age verification boxes 714, through which the user can verify his age. Some products may be restricted to users over the age of eighteen. For example, some over the counter medicines, some literary material, certain household cleansers, and the like, can be restricted by age. As such, the user may be prompted to enter his or her age prior to completing the transaction.

As explained above, an advertisement can include hidden form data that indicates, for example, the name of the product advertised, information needed by a supplier to send a user a sample of the advertised product, prices and/or shipping charges for mailing the product, other information, and the like. These and other data can be received and logged by the COS 116 or other network elements for tracking, billing, commission payment, order fulfillment, and/or other purposes, and can be used to generate an order confirmation list 716 for a user's review and submission. If desired, the order confirmation list 716 can be coded as an editable field. In some embodiments, the order confirmation list 716 is not editable.

The GUI 700 can include various options, for example, an option 718 to go to previously viewed/retrieved Internet content, an option 720 to cancel the order, an option 722 to submit the reviewed and confirmed order, additional and/or alternative options (not illustrated), combinations thereof, and the like. It should be understood that the illustrated options 718, 720, 722 are exemplary only. Additional and/or alternative options are possible and contemplated. As explained above, some, none, or all of the fields 708, 710, 712, 714, 716 can be labeled and/or treated as optional or required. The illustrated labels are exemplary only.

Although not described in detail above, the COS 116 can also handle order requests that allow or require payment. For example, the forms can include options to charge credit cards, debit accounts, a communications account, and the like. The payment options can be retrieved from the user's communication account, if desired, or can be entered by the user before, during, and/or after, review and confirmation of the order.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A system comprising:
a customer ordering system that comprises a server computer having a processor; and a memory that stores instructions that, when executed by the processor, cause the processor to perform operations comprising
initializing a data session between a mobile telecommunications device and a cellular network,
generating, in response to detecting initialization of the data session and by the cellular network, a network identity for the mobile telecommunications device, wherein the network identity is based on an international mobile equipment identity of the mobile telecommunications device,
assigning the network identity to the mobile telecommunications device, wherein the network identity is known by a web server that is accessed by the mobile telecommunications device over the cellular network during the data session, but the web server does not know the identity of a user of the mobile telecommunications device,
detecting, by the server computer and during the data session, an interaction between the mobile telecommunications device and an advertisement on a web page hosted by the web server that is accessed by the mobile telecommunications device over the network during the data session, wherein the interaction comprises input that instructs the mobile telecommunications device to access a further web server to initiate a transaction relating to the advertisement,
in response to detecting the interaction, determining that the advertisement is associated with an advertising partner of the customer ordering system by recognizing that a link to a landing page is included in the advertisement, wherein the landing page is stored by the customer ordering system and comprises hidden data that indicates a product and a supplier associated with the advertisement and the advertising partner,
in response to detecting the interaction and recognizing that the link is included, redirecting the mobile telecommunications device to the landing page stored by the customer ordering system to complete the transaction,
identifying information that is requested by the advertising partner to complete the transaction, wherein the information that is requested comprises a shipping address and a name associated with the user of the mobile telecommunications device,
determining, by accessing the cellular network the network identity that is associated with the mobile telecommunications device,
retrieving, based upon the network identity that is associated with the mobile telecommunications device, subscriber data associated with the user of the mobile telecommunications device, wherein the subscriber data comprises the information that is requested, and wherein the subscriber data is obtained from a home location register of the cellular network and comprises account information associated with the user of the mobile telecommunications device, populating, by the processor, an order form included in the landing page using the subscriber data, wherein the order form is populated by the processor before providing the landing page to the mobile telecommunications device for display at the mobile telecommunications device, wherein the landing page comprises a submit option to complete the transaction, detecting submission of the order form, and providing an order to an order filler for order fulfillment comprising shipping of the product from the supplier to the user, whereby the advertising partner does not receive the subscriber data associated with the user of the mobile telecommunications device.

2. The system of claim 1, wherein the landing page comprises a further web page that is hosted by the further web server.

3. The system of claim 1, wherein the advertisement comprises an offer to obtain a sample of the product from the supplier.

4. The system of claim 1, wherein the input comprises a click on the advertisement.

5. A method comprising:

initializing, by a system that comprises a customer order system comprising a server computer having a processor, a data session between a mobile telecommunications device and a cellular network;

generating, by the system and in response to detecting initialization of the data session and by the cellular network, a network identity for the mobile telecommunications device, wherein the network identity is based on an international mobile equipment identity of the mobile telecommunications device;

assigning, by the system, the network identity to the mobile telecommunications device, wherein the network identity is known by a web server that is accessed by the mobile telecommunications device over the cellular network during the data session, but the web server does not know the identity of a user of the mobile telecommunications device;

detecting, by the system and during the data session, an interaction between the mobile telecommunications device and an advertisement on a web page hosted by the web server that is accessed by the mobile telecommunications device over the cellular network during the data session, wherein the interaction comprises input that instructs the mobile telecommunications device to access a further web server to initiate a transaction relating to the advertisement;

in response to detecting the interaction, determining, by the system, that the advertisement is associated with an advertising partner of the customer ordering system by recognizing that a link to a landing page is included in the advertisement, wherein the landing page is stored by the customer ordering system and comprises hidden data that indicates a product and a supplier associated with the advertisement and the advertising partner;

in response to detecting the interaction and recognizing that the link is included, redirecting, by the system, the mobile telecommunications device to the landing page stored by the customer ordering system to complete the transaction;

identifying, by the system, information that is requested by the advertising partner to complete the transaction, wherein the information that is requested comprises a shipping address and a name associated with the user of the mobile telecommunications device;

determining, by the system and by accessing the cellular network, the network identity that is associated with the mobile telecommunications device;

retrieving, by the system and based upon the network identity that is associated with the mobile telecommunications device, subscriber data associated with the user of the mobile telecommunications device, wherein the subscriber data comprises the information that is requested, and wherein the subscriber data is obtained from a home location register of the cellular network and comprises account information associated with the user of the mobile telecommunications device;

populating, by the processor, an order form included in the landing page using the subscriber data, wherein the order form is populated by the processor before providing the landing page to the mobile telecommunications device for display at the mobile telecommunications device, wherein the landing page comprises a submit option to complete the transaction; and detecting, by the system, submission of the order form; and providing, by the system and to an order filler, an order for order fulfillment comprising shipping of the product from the supplier to the user, whereby the advertising partner does not receive the subscriber data associated with the user of the mobile telecommunications device.

6. The method of claim 5, wherein the advertisement comprises an offer to obtain a sample of the product from the supplier.

7. The method of claim 5, wherein the input comprises a click on the advertisement.

8. A non-transitory computer-readable storage medium comprising computer-readable instructions that, when executed, cause a processor to perform operations comprising:

initializing a data session between a mobile telecommunications device and a cellular network;

generating, in response to detecting initialization of the data session, a network identity for the mobile telecommunications device, wherein the network identity is based on an international mobile equipment identity of the mobile telecommunications device;

assigning the network identity to the mobile telecommunications device, wherein the network identity is known by a web server that is accessed by the mobile telecommunications device over the cellular network during the data session, but the web server does not know the identity of a user of the mobile telecommunications device;

detecting, during the data session, an interaction between the mobile telecommunications device and an advertisement on a web page hosted by the web server that is accessed by the mobile telecommunications device during the data session, wherein the interaction comprises input that instructs the mobile telecommunications device to access a further web server to initiate a transaction relating to the advertisement;

in response to detecting the interaction, determining that the advertisement is associated with an advertising partner of a customer ordering system by recognizing that a link to a landing page is included in the advertisement, wherein the landing page is stored by the customer ordering system and comprises hidden data that indicates a product and a supplier associated with the advertisement and the advertising partner;

redirecting the mobile telecommunications device to the landing page stored by the customer ordering system to complete the transaction;

identifying information that is requested by the advertising partner to complete the transaction, wherein the information that is requested comprises a shipping address and a name associated with the user of the mobile telecommunications device;

determining, by accessing the cellular network, the network identity that is associated with the mobile telecommunications device;

retrieving, based upon the network identity that is associated with the mobile telecommunications device, subscriber data associated with the user of the mobile telecommunications device, wherein the subscriber data comprises the information that is requested, and wherein the subscriber data is obtained from a home location register of the cellular network and comprises account information associated with the user of the mobile telecommunications device;

populating, by the processor, an order form included in the landing page using the subscriber data, wherein the order form is populated by the processor before providing the landing page to the mobile telecommunications device for display at the mobile telecommunications device, wherein the landing pace comprises a submit option to complete the transaction;

detecting submission of the order form; and providing an order to an order filler for order fulfillment comprising shipping of the product from the supplier to the user, whereby the advertising partner does not receive the subscriber data associated with the user of the mobile telecommunications device.

9. The non-transitory computer-readable storage medium of claim 8, wherein the landing page comprises a further web page that is hosted by the further web server.

10. The non-transitory computer-readable storage medium of claim 8, wherein the advertisement comprises an offer to obtain a sample of the product from the supplier.

11. The non-transitory computer-readable storage medium of claim 8, wherein the input comprises a click on the advertisement.

* * * * *